May 17, 1932.     A. F. MASURY     1,858,784
INDIVIDUAL WHEEL MOUNTING
Filed March 12, 1931
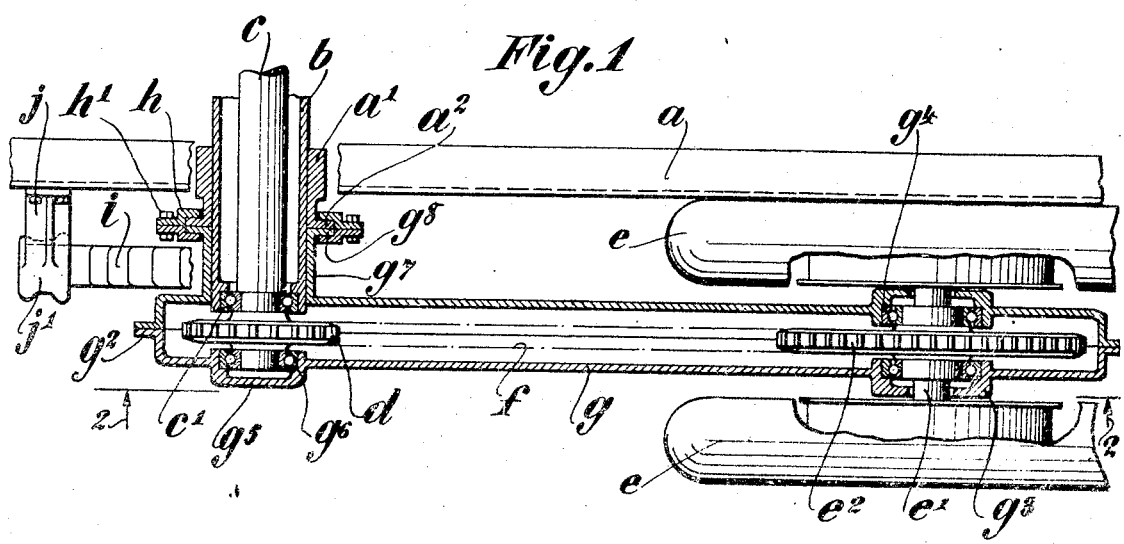
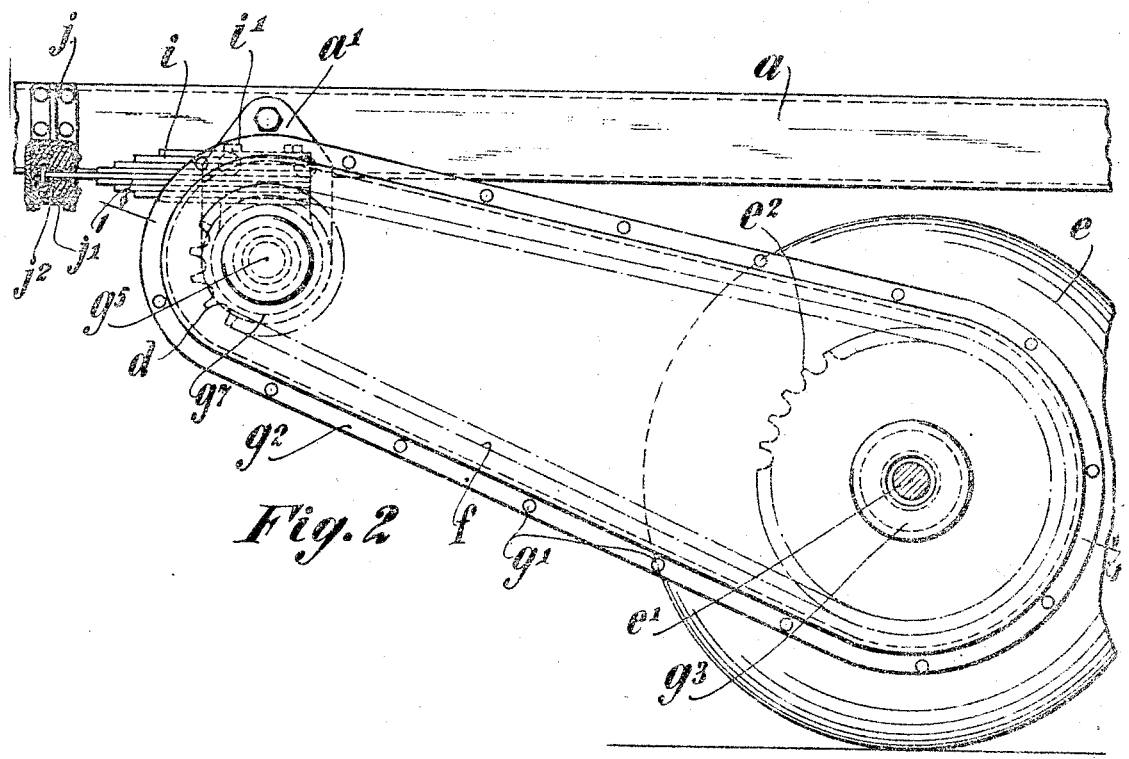
Inventor:
Alfred F. Masury,
By his attorneys:
Redding, Greeley, O'Shea & Campbell Patented May 17, 1932

1,858,784

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

INDIVIDUAL WHEEL MOUNTING

Application filed March 12, 1931. Serial No. 521,961.

The present invention relates to wheel mountings for motor vehicles and embodies, more specifically, an improved form of wheel mounting in which a plurality of wheels are mounted as a unit at one point upon the vehicle frame and driven independently of the other wheels upon which the frame is mounted.

The requirements upon wheel mountings in service are quite severe and it is highly desirable, particularly where wheels are mounted individually upon the vehicle frame, to have the mounting of sufficient strength that the stresses and strains during operation may be received without deleterious effects. To answer the above requirements, the present invention has been designed and it incorporates a form of drive and wheel mounting which is not only of considerable strength, but is simple in construction and easily assembled and dismounted when in use.

An object of the invention, accordingly, is to provide a wheel mounting which is of simple construction and easily assembled and dismounted from the chassis.

A further object of the invention is to provide a mounting of the above character which is sufficiently strong to receive the stresses and shocks imposed upon it during use, without having any deleterious effects thereon.

Further objects of the invention, not specifically enumerated above, will be apparent from the following description, wherein:

Figure 1 is a view in section, taken on line 1—1 of Figure 2, and looking in the direction of the arrows.

Figure 2 is a view in section, taken on line 2—2 of Figure 1, and looking in the direction of the arrows.

Referring to the above drawings, $a$ designates a vehicle frame to which a bracket $a'$ is secured. An axle housing $b$ carries a jack shaft $c$ at the end of which a driving sprocket $d$ is mounted. The bracket $a'$ is formed with an annular flange $a^2$ and the jack shaft $c$ is journaled at $c'$ in the outer extremity of the axle housing $b$.

Wheels $e$ are mounted upon shaft $e'$ which carries a driven sprocket $e^2$ in alignment with driving sprocket $d$. A suitable chain $f$ transmits the drive between driving and driven sprockets $d$ and $e^2$, respectively, the chain being indicated in dot and dash lines in the figures. Wheels $e$ and shaft $e'$ are mounted in a housing $g$ which is shown as being a two part housing united in the median plane thereof by bolts $g'$ through flanges $g^2$. Recesses $g^3$ are formed in the housing $g$ and receive bearings $g^4$ for mounting the shaft $e'$.

A recess $g^5$ is formed at the upper end of housing $g$ and carries a bearing $g^6$ within which the outer extremity of axle $c$ is journaled, thus affording a bearing surface on either side of the driving sprocket $d$. On the inner section of housing $g$, a sleeve $g^7$ is formed, a flange $g^8$ being provided at the inner extremity thereof to cooperate with the flange $a^2$ on the bracket $a'$. Cooperating clamps $h$ are secured together by bolts $h'$ and prevent the removal of the housing $g$ and sleeve $g^7$ from the axle housing $b$ permitting, however, rotative movement of the housing $g$ with respect to the axle housing $b$.

The rotative movement mentioned in the foregoing paragraph, incidental to the movement of the wheels with respect to the frame, is cushioned by a spring $i$ which is clamped to the sleeve $g^7$ by bolts $i'$. A bracket $j$ formed with a housing $j'$ is mounted on the frame member $a$ and carries a block of yielding nonmetallic material $j^2$. The extremity of the cantilever spring $i$ is received in the block of yielding nonmetallic material $j^2$ and thus affords a yielding suspension for the wheels $e$ and housing $g$.

While the invention has been described with specific reference to the construction shown in the accompanying drawings, it is not to be limited, save as defined in the appended claims.

I claim as my invention:

1. An individual wheel mounting comprising a frame, a wheel, a bracket on the frame formed with a sleeve, an axle housing carried in the bracket, a wheel support journaled on the axle housing and mounting the wheel, an outwardly projecting flange on the sleeve, a flange on the support, means to secure the flanges together, means in the support to drive the wheel, and a spring between the support and frame.

2. An individual wheel mounting comprising a frame, a wheel, a bracket on the frame, an axle housing carried in the bracket, a wheel support journaled on the axle housing and mounting the wheel, a flange on the support, a flange on the bracket, means to secure the flanges together, a driving sprocket in the support, means in the opposite sides of the support to journal the sprocket and a spring between the support and frame.

This specification signed this 10th day of March A. D. 1931.

ALFRED F. MASURY.